M. M. STIMMEL.
TESTING BLOCK.
APPLICATION FILED MAR. 3, 1920.

1,367,285.

Patented Feb. 1, 1921.
2 SHEETS—SHEET 1.

Inventor
Martin M. Stimmel
By Arthur L. Slee
Atty.

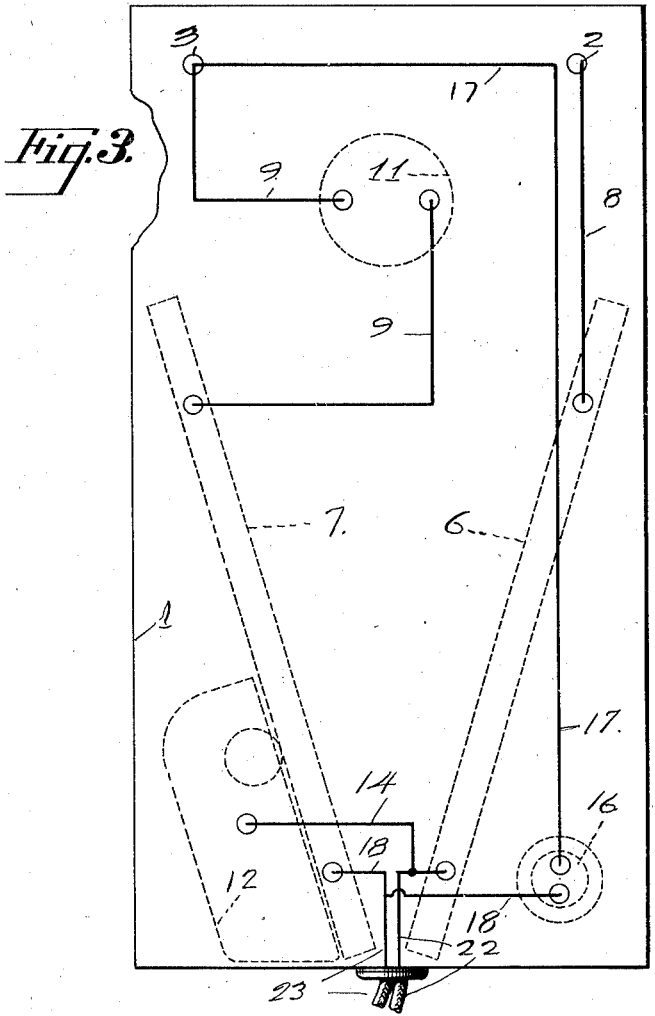
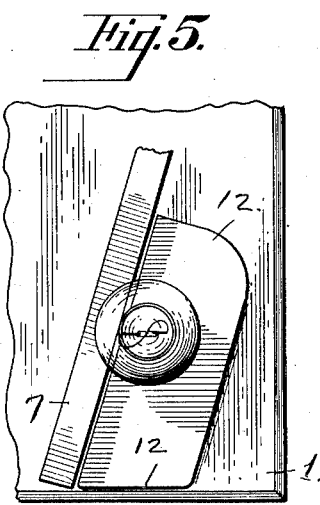
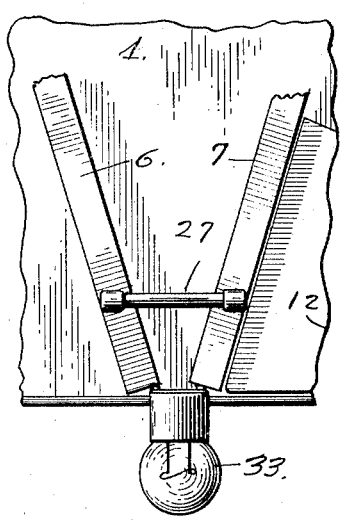
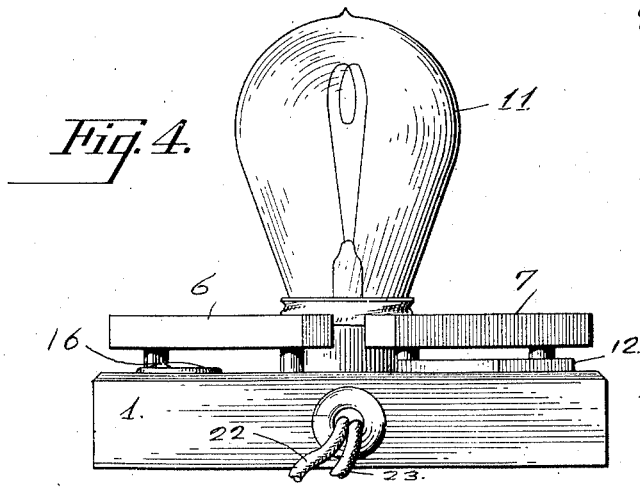

UNITED STATES PATENT OFFICE.

MARTIN M. STIMMEL, OF SAN FRANCISCO, CALIFORNIA.

TESTING-BLOCK.

1,367,285.  Specification of Letters Patent.  Patented Feb. 1, 1921.

Application filed March 3, 1920. Serial No. 364,325.

*To all whom it may concern:*

Be it known that I, MARTIN M. STIMMEL, a citizen of the United States, residing in the city and county of San Francisco and State of California, have invented new and useful Improvements in Testing-Blocks, of which the following is a specification.

My invention relates to improvements in testing blocks for electrical apparatus wherein lamps and other electrical apparatus of various sizes and resistances may be tested.

The primary object of the present invention is to provide an improved testing block adapted to permit the passage of a current of electrical energy through electrical apparatus of various sizes and conductivity.

A further object of the invention is to provide an improved and simplified form of testing block adapted to be operated by connection to an ordinary lighting socket.

A still further object of the present invention is to provide an improved device of the character described that shall be adapted to pass a reduced current of electrical energy through small flash lamps for pocket batteries of low voltage and amperage, as well as small fuses of low amperage such as are commonly used on motor vehicles and the like.

A still further object is to provide an improved testing block having simple and improved facilities for testing any type of electrical apparatus having exposed or inclosed terminals.

I accomplish these and other objects by means of the improved device disclosed in the drawings forming a part of the present specification wherein like characters of reference are used to designate similar parts throughout the said specification and drawings, and in which—

Fig. 3 is a rear view disclosing the wiring system of the device;

Fig. 4 is a bottom view of the device;

Fig. 5 is a broken detailed view disclosing the application of one form of small lamp for testing purposes; and Fig. 6 is a similar view disclosing the application of another form of lamp and motor vehicle fuse.

Figure 1:
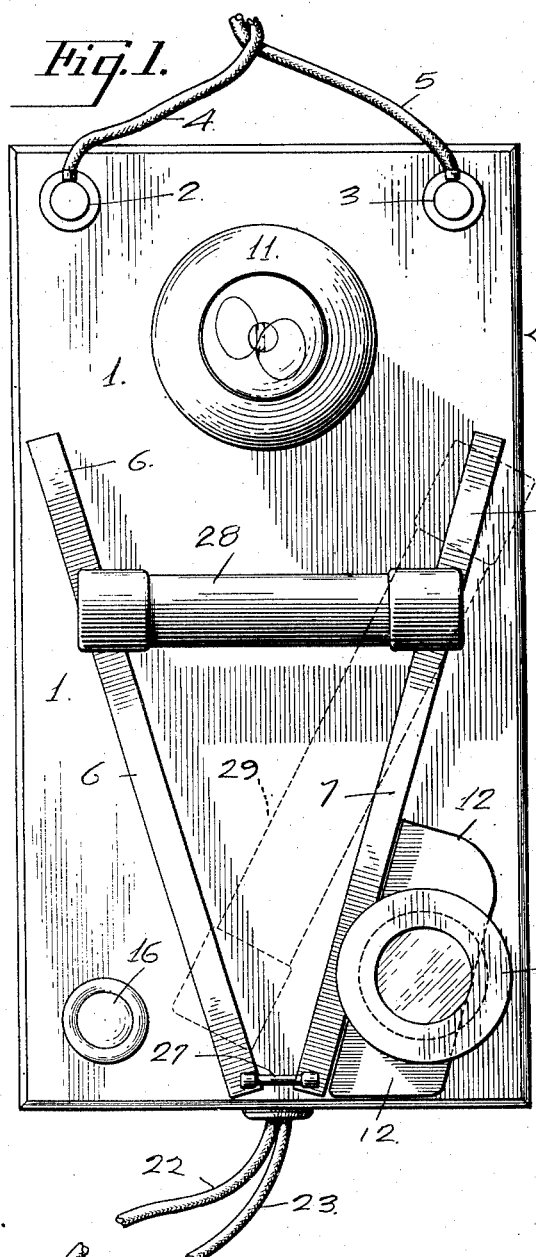
Figure 1 is a front elevation of my improved testing block.
Figure 2:
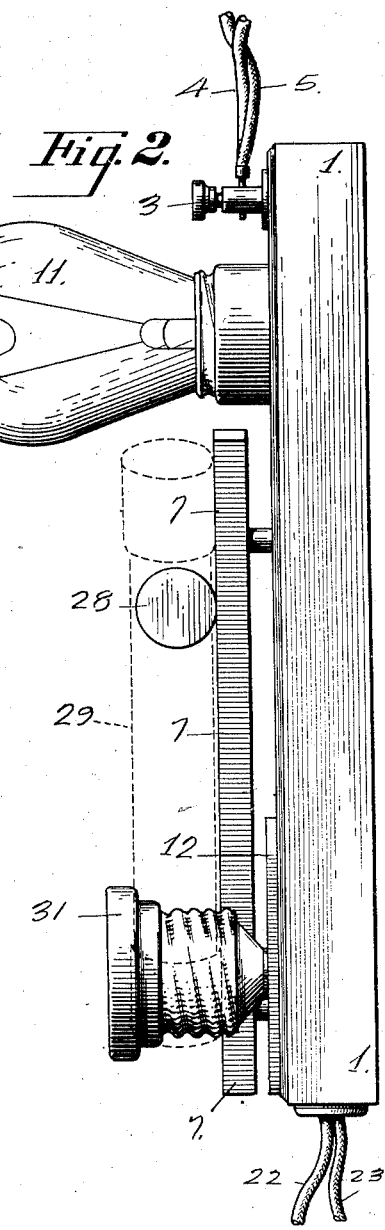
Fig. 2 is a side elevation thereof.
Figure 2:
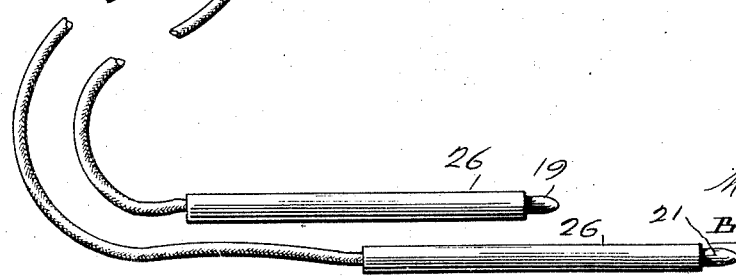

Referring to the drawings the numeral 1 is used to designate a suitable base which may be a wooden board or of fiber of any other suitable non-conducting material. A pair of terminals 2 and 3 are provided at one end of the base 1 and arranged to be connected to a suitable source of electrical energy as disclosed by the broken wires 4 and 5.

Converging bars 6 and 7 are mounted a slight distance above the base 1 and insulated from each other but electrically connected to the terminals 2 and 3 by means of the connections 8 and 9 respectively, the connection 9 having a resistance lamp 11 connected in series therewith.

A contact plate 12 is set in the base 1 and adjacent but spaced apart and insulated from the bar 7 in series with the lamp resistance 9 and has an electrical connection 14 to the bar 6.

An electrical switch 16, preferably of the push button type, is provided at one portion of the base 1 and has a connection 17 to the terminal 3 and a connection 18 to the bar 7. In other words the switch 16 is arranged or connected in parallel with the resistance lamp 11 and the bar 7, said switch 16 being normally open but when closed will cause electrical energy to flow from the terminal 3 around the resistance 11 to the bar 7 instead of through said resistance 11 to said bar 7.

Testing plugs 19 and 21 are connected to the terminals 3 and 2 through the bars 7 and 6 by means of connections 22 and 23 which are flexible and freely pendant, one of said connections being longer than the other so that the metal points of said plugs may not inadvertently or accidentally contact while so pendant.

The plugs are provided with suitable insulating sleeves 26.

The bars 6 and 7 are converged in order to provide a varying space between said bars to facilitate the contacting of the metallic ends of electrical fuses of various sizes and lengths with said bars as disclosed by the fuses 27 and 28 in full lines and the fuse 29 in dotted lines in Fig. 1 of the drawings.

The adjacent ends of the bars 6 and 7 may also be used for contact with the double terminal lamps 33, such as that shown in Fig. 6 of the drawings, which are commonly used in motor vehicles.

It will be noted that the novel arrangement of the converging bars provides a range adapted to accommodate fuses of various sizes from the small motor vehicle fuse 27 of low amperage to the full sized cartridge fuse 29 shown in dotted lines in Fig. 1 of the drawings, which may contact with said bars by arranging said fuse diagonal so that one end will contact with the divergent end of one bar and the convergent end of the other bar.

Socket fuses 31, or socket lamps, not shown, but similar in the structure of their contacts, are more conveniently tested by placing the butt or end contact on the contact plate 12 and the sleeve contact of said fuse, or lamp, on the adjacent bar 7, the plate 12 performing the same function as the bar 6 to which it is connected by the connection 14.

The terminals or plugs 19 and 21 are provided to contact with the inclosed terminals of electrical apparatus such as electrical irons, toasters and the like, not shown.

In operation the fuse, plug or lamp to be tested is placed with its contacts contacting with the bar 7 and either the bar 6 or the plate 12 according to the type of device to be tested. If the device is in order, connection will be made between the bars 6 and 7 and the current will flow from the terminal 3 through the resistance lamp 11, the bar 7, the device being tested and the bar 6 to the terminal 2, the resistance lamp 11 being illuminated, thereby indicating that the device tested is in order. The flow of electrical energy is so reduced by the resistance lamp 11 as to prevent the burning out of small lamps and fuses of low current carrying capacity.

In testing lamps in the above manner the current is so reduced by the resistance lamp 11 that the lamp being tested will be illuminated only to a very low degree, if at all. If it is desired to cause the lamp to be illuminated to its full lighting power the current is shunted around the resistance lamp 11 by depressing the switch 16, thereby directing the full current through the lamp being tested. Lamps of low current carrying capacity such as small automobile lamps and the like cannot be tested in this manner as the full current would cause the fine filaments to be burned out and the lamp ruined.

The plugs 19 and 21 function in a manner identical with the bars 7 and 6 to which they are connected, the plugs being inserted and caused to contact with inclosed terminals such as provided on electric irons, stoves, toasters and the like, not shown.

Having thus described my invention what I claim as new and desire to secure by Letters Patent is—

1. A testing block for electrical apparatus comprising a base; terminals mounted upon the base and arranged to be connected with a source of electrical energy; bars mounted upon the base and arranged divergently to provide for contact with fuses of various lengths, said bars being connected with the binding posts; and a resistance connected in series with one of the bars and its binding post in order to limit the flow of current through devices being tested.

2. A testing block for electrical apparatus comprising a base; terminals mounted upon the base and arranged to be connected with a source of electrical energy; bars mounted upon the base and arranged to provide for contact with fuses of various lengths, said bars being connected with the binding posts; a resistance connected in series with one of the bars and its binding post whereby electrical apparatus having insufficient conductivity for the electrical energy conveyed may be tested by contact with said bars; and a switch in parallel with the resistance and its bar arranged to shunt current around said resistance and its bar in order to limit the flow of current through devices being tested.

3. A testing block for electrical apparatus comprising a pair of bars arranged divergently to be engaged by fuses of various lengths, said bars being insulated from each other; means for connecting the bars with a source of electrical energy; and a resistance arranged in series with one of said bars in order to limit the flow of current through devices being tested.

4. A testing block for electrical apparatus comprising a pair of bars arranged to be engaged by fuses of various lengths, said bars being insulated from each other; means for connecting the bars with a source of electrical energy; a resistance arranged in series with one of said bars in order to limit the flow of current through devices being tested and a switch arranged in parallel with the resistance and its bar whereby apparatus of sufficient conductivity to carry the entire current supplied to said bars may be tested by contact with said bars.

5. A testing block for electrical apparatus comprising a pair of bars arranged divergently to be engaged by fuses of various lengths, said bars being insulated from each other; means for connecting the bars with a source of electrical energy; and a lamp resistance connected in series with one of the bars in order to limit the flow of current through devices being tested.

6. A testing block for electrical apparatus comprising a pair of bars arranged to be engaged by fuses of various lengths, said bars being insulated from each other; means for connecting the bars with a source of electrical energy; a lamp resistance connected in series with one of the bars in order to limit the flow of current through devices being tested, and a switch arranged in parallel with said source of electrical energy and the resistance lamp and its connected bar whereby apparatus of sufficient conductivity to carry the entire current from said source of electrical energy may be tested by contact with said bars when said switch is operated to shunt said current around said resistance lamp to the bar electrically connected therewith.

7. A testing block for electrical apparatus comprising a pair of bars arranged divergently to be engaged by fuses of various lengths, said bars being insulated from each other; means for connecting the bars with a source of electrical energy; a resistance arranged in series with one of said bars in order to limit the flow of current through devices being tested and a contact plate arranged adjacent to and insulated from the bar connected to the resistance and electrically connected to the other bar whereby socket fuses and socket lamps of insufficient conductivity to carry the entire current from said source of electrical energy may be tested by contact with said contact plate and adjacent bar, and in series with said resistance.

8. A testing block for electrical apparatus comprising a pair of bars arranged to be engaged by fuses of various lengths, said bars being insulated from each other; means for connecting the bars with a source of electrical energy; a resistance arranged in series with one of said bars in order to limit the flow of current through devices being tested, a switch arranged in parallel with the resistance and its bar whereby apparatus of sufficient conductivity to carry the entire current supplied to said bars may be tested by contact with said bars; and a contact plate arranged adjacent to and insulated from the bar connected to the resistance and electrically connected to the other bar whereby socket fuses and socket lamps of sufficient conductivity to carry said source of electrical energy may be tested by contact with said plate and bar when said switch is operated to shunt said current around said resistance.

9. A testing block for electrical apparatus comprising a pair of bars arranged to be engaged by fuses of various lengths, said bars being insulated from each other; means for connecting the bars with a source of electrical energy; a resistance arranged in series with one of said bars in order to limit the flow of current through devices being tested; and a testing plug connected to each bar and insulated adjacent the end thereof to contact with inclosed terminals of electrical apparatus, one of said terminals being longer than the other to prevent contact between the same when pendent.

10. A testing block for electrical apparatus comprising a base; a pair of converging bars mounted above the base and insulated from each other and arranged to engage by contact, the terminals of fuses of various lengths; a pair of terminals mounted upon the base adapted for connection to a source of electrical energy and electrically connected to the bars; a resistance lamp connected in series between one terminal and its bar; and a contact plate electrically connected to the other bar and arranged adjacent to and insulated from the bar in series with the resistance lamp in order to limit the flow of current through devices being tested by contact with the bars or with the bar connected to the resistance lamp and its bar.

11. A testing block for electrical apparatus comprising a base; a pair of converging bars mounted above the base and insulated from each other and arranged to engage by contact the terminals of fuses of various lengths; a pair of terminals mounted upon the base adapted for connection to a source of electrical energy and electrically connected to the bars; a resistance lamp connected in series between one terminal and its bar; a contact plate electrically connected to the other bar and arranged adjacent to and insulated from the bar in series with the resistance lamp in order to limit the flow of current through devices being tested by contact with the bars or with the bar connected to the resistance lamp and its bar; and means for shunting said electrical energy around said resistance lamp to its bar whereby electrical apparatus having sufficient conductivity to carry said electrical energy may be tested by both bars and by the contact plate and its adjacent bar.

In witness whereof I hereunto set my signature.

MARTIN M. STIMMEL.